United States Patent [19]

Brickell

[11] Patent Number: 5,554,993
[45] Date of Patent: Sep. 10, 1996

[54] GLOBAL POSITION DETERMINING SYSTEM AND METHOD

[75] Inventor: John W. Brickell, Raleigh, N.C.

[73] Assignee: Panasonic Technologies, Inc., Secaucus, N.J.

[21] Appl. No.: 177,252

[22] Filed: Jan. 4, 1994

[51] Int. Cl.$^6$ .............................. G04S 5/10; H04D 7/185
[52] U.S. Cl. ........................................... 342/357; 342/457
[58] Field of Search ...................................... 342/357, 457, 342/385, 386; 455/38.3

[56] References Cited

U.S. PATENT DOCUMENTS

| | | |
|---|---|---|
| 3,063,048 | 11/1962 | Lehan et al. . |
| 3,440,635 | 4/1969 | Hull . |
| 3,876,980 | 4/1975 | Haemmig et al. ............... 371/69.1 |
| 4,045,799 | 8/1977 | Dapiran . |
| 4,177,466 | 12/1979 | Reagan . |
| 4,240,079 | 12/1980 | Zhilin . |
| 4,596,988 | 6/1986 | Wanka . |
| 4,740,792 | 4/1988 | Sagey et al. ...................... 342/457 |
| 4,819,053 | 4/1989 | Halavais . |
| 4,908,629 | 3/1990 | Apsell et al. ...................... 342/457 |
| 4,965,586 | 10/1990 | O'Neill et al. . |
| 5,021,794 | 6/1991 | Lawrence ........................... 342/457 |
| 5,043,736 | 8/1991 | Darnell et al. . |
| 5,111,209 | 5/1992 | Toriyama . |
| 5,115,223 | 5/1992 | Moody . |
| 5,119,102 | 6/1992 | Barnard . |
| 5,202,829 | 4/1993 | Geier . |
| 5,223,844 | 6/1993 | Mansell et al. .................. 342/357 |
| 5,252,963 | 10/1993 | Snowden et al. ............. 340/825.44 |

*Primary Examiner*—Thomas H. Tarcza
*Assistant Examiner*—Dao L. Phan
*Attorney, Agent, or Firm*—Bell, Seltzer, Park & Gibson, P.A.

[57] ABSTRACT

A global position determining system conserves battery power in a battery powered user terminal by transmitting its approximate position initially and then inhibiting transmission of a homing beacon until a homing terminal is in the vicinity of the user terminal. After user activation, the user terminal determines its own approximate position and transmits an approximate position signal to a satellite. The satellite then relays the approximate position signal to a mobile homing terminal. After moving the mobile homing terminal toward the approximate position, an activate homing beacon command is transmitted to the user terminal. When the transmitted command is received, the homing beacon is activated. Upon activation of the homing beacon, a directional antenna of the mobile homing terminal can be oriented toward a first direction which has a strong homing beacon reception relative to other directions and moved towards that direction.

45 Claims, 5 Drawing Sheets

GLOBAL POSITION DETERMINING SYSTEM AND METHOD

FIELD OF THE INVENTION

This invention relates to the field of position determining systems and methods, such as search and rescue systems and associated methods.

BACKGROUND OF THE INVENTION

Position determining systems are useful both for those who need to know their own location and for those who need to know the locations of others. One system, the Loran system, was developed in the United States during World War II and was maintained by the U.S. Coast Guard as an aid to ships and aircraft. The smallest working component of the Loran system requires two transmitters, a master and a slave repeating the master, and a receiver. The receiver tracks the master and slave signals with phase-locked loops and presents their time differences on a display. For each time difference there is a hyperbolic line of position. Accordingly, systems of this type are called hyperbolic systems. The time differences can be transferred to a map on which hyperbolic lines of position have been printed. Alternatively, a computer can provide direct readouts in latitude and longitude. The Loran network, however, does not cover major portions of the globe and its receivers are generally expensive.

The Global Positioning System (GPS) is a network of approximately 24 satellites and a dozen ground stations. The GPS network currently provides navigation information worldwide. A receiver derives its three-dimensional position from ranging signals received from three or more satellites. The Loran and GPS networks, however, do not provide any signal relays in a crisis. Thus, if one had a GPS receiver, the position of an emergency would be known, but there would be no way within the system to communicate that position to potential rescue teams.

Emergency radio beacons are often used in conjunction with satellites to indicate an accident or crisis. Beacons of this type typically transmit a signal which is received by a satellite which then retransmits the signal to an earth station for computer analysis. The computer provides a position estimate, and search aircraft then use conventional techniques to locate the radio beacon. The initial location is usually calculated using doppler shift information at the earth station.

For example, U.S. Pat. No. 4,240,079 to Zhilin discloses a location system in which a mobile emergency radio beacon can be manually or automatically activated. A coded signal from the emergency radio beacon is received by a satellite and retransmitted to a receiving station directly or via a geostationary satellite. The receiving station then calculates the position of the emergency radio beacon. Geostationary satellites, however, require fairly large, high-powered, and expensive terminals on the ground. High powered terminals on the ground are required because of the long transmission distances from earth and the need to use microwaves (L-Band and above) to form narrow beams on the satellites.

Another problem with emergency beacons is that they usually transmit their homing signal continuously. A standard emergency beacon continuously transmits for two basic reasons. First, continuous radiation provides a base station with a reference from which to calculate an initial approximate position. Second, the continuous radiation acts as a homing beacon which radiates until a final rescue. However, if a rescue team takes a number of hours to arrive at a remote location, then the battery of a conventional emergency beacon could expire. If a continuously transmitting emergency beacon depletes its battery supply prior to a rescue team's arrival, then the rescue team must resort to traditional and less precise search methods. Moreover, those in need of remote rescue do not usually remain conveniently in place near an initial approximate position. Thus, an individual adrift in a lifeboat at sea is subject to winds and currents, and those lost in a forest may attempt to hike out. In these cases, an emergency beacon which runs out of battery power can offer an initial distress call, but the approximate position determined by base station computers provides only a reference point for search and rescue teams.

A global messaging network, known as ORBCOMM, has been proposed by the Orbital Communications Corporation of Fairfax, Va. The ORBCOMM system is described in a brochure published by the Orbital Communications Corporation entitled *ORBCOMM, Vital Communications Absolutely Anyplace on Earth*. The ORBCOMM system is designed to bring data communications and position determination to a multitude of mobile remote units. The ORBCOMM network provides low speed VHF digital data communications using low earth orbiting satellites that have a very high availability. As shown in FIG. 1, the basic ORBCOMM network uses a network of satellites 111, a network control station 112, and a base station 113 to communicate with the remote units 110. A typical message of around 100 bytes or characters will be transmitted from a remote unit 110 through the satellite 111 and to a network control center 112. The data can then be stored at the network control center 112 and accessed at a customer's convenience, similar to electronic mail. A customer at a base station 113, which could be a portable computer with a MODEM, can then poll the network control center 112 for messages via a standard phone line 117.

The remote units 110 contemplated by ORBCOMM do offer some emergency features. For example, an emergency alerting option can send a short emergency alert message to a customer's base station 113 upon user activation. The remote unit 110 continues to send the alert until it receives confirmation of its receipt. The remote unit 110 can also determine and send its approximate position with the emergency alert. The ORBCOMM network, however, does not provide a mechanism by which a position determining team can home in on the individual in distress. Consequently, if an individual in distress transmits an emergency alert with an approximate position that is more than a kilometer distant from his location, then the search and rescue team must still resort to traditional search methods after they reach the approximate position.

SUMMARY OF THE INVENTION

It is therefore an object of the present invention to provide a global position determining system and method.

It is a further object of the invention to provide a global position determining system and method that does not require a homing beacon to broadcast continually.

These and other objects according to the invention are provided by a global position determining system wherein a user terminal transmits an approximate position signal to initiate a search mission. The user terminal then transmits a continuous wave homing beacon, but only in response to radio reception of a homing beacon activation command which indicates that a search team is nearby. In other words, transmission of the homing beacon is inhibited until radio reception of an activate homing beacon command. Battery power is thus conserved in the user terminal.

More particularly, the global position determining system transmits signals between an individual in distress and a search team, and includes a satellite, a mobile homing terminal, and a battery powered mobile user terminal. The battery powered user terminal includes a transmitter for transmitting an approximate position signal in response to user activation so that the search mission is initiated. A position locator for determining an approximate position is also contained in the battery powered user terminal. The position locator uses received satellite data and measurements of the doppler shifts in a satellite transmission to calculate its approximate position. The user terminal also includes an activation device for activating a homing beacon, but only in response to radio reception of an "activate homing beacon" command.

The mobile homing terminal includes a receiver for receiving an indication of the approximate position signal. For example, the indication of the approximate position may be transmitted to the homing terminal from the satellite, a network control center, or a base station. The activate homing beacon command can be transmitted by the homing terminal or the satellite. The mobile homing terminal additionally includes a homing device for closing in on and locating the homing beacon of the user terminal. The homing device preferably includes a received signal strength indicator and an associated display.

The preferred position determining method begins with remote activation of the user terminal by an individual. The user terminal then uses satellite position data, satellite velocity data, and doppler shift measurements from a received satellite transmission to determine its approximate position within about one to three kilometers. The user terminal transmits the approximate position signal to the satellite, and the satellite relays the approximate position signal to the mobile homing terminal. After the mobile homing terminal has approached the approximate position, an activate homing beacon command is transmitted to the user terminal. The user terminal receives the transmitted command and transmits its homing beacon. Upon activation of the homing beacon, a directional antenna of the mobile homing terminal can be oriented in a first direction which has a strong homing beacon reception relative to other directions. The homing terminal can then move towards and locate the homing beacon.

Accordingly, the user terminal first transmits its approximate position through a satellite to a search team. The user terminal then transmits its homing beacon, but only upon radio reception of an activation command which indicates that the search team is in the vicinity of the user terminal. There is no need for a continuously radiating beacon upon which a base station calculates an initial approximate position. Nor is there a need for a homing beacon to continuously radiate from the occurrence of a crisis until an individual is found. Battery power is thereby conserved, insuring that the homing beacon can be transmitted at the most important stage of a search effort.

DESCRIPTION OF PREFERRED EMBODIMENTS

The present invention will now be described more fully hereinafter with reference to the accompanying drawings, in which preferred embodiments of the invention are shown. The inventive position determining system and method is often described in terms of search and rescue methods and systems, however, it should be understood that the present invention can be used for general position determining of an emergency and a non-emergency nature. Thus, this invention may be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

Figure 1:
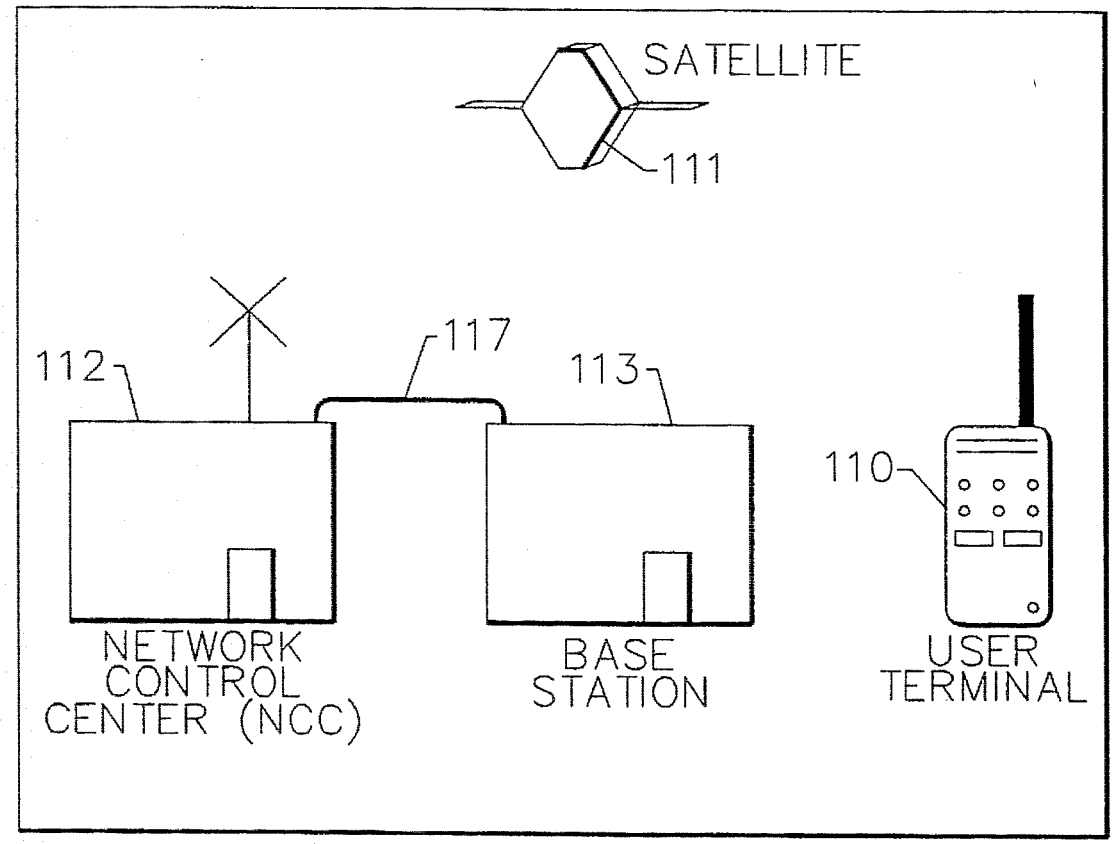
FIG. 1 is a schematic illustration of the prior art ORBCOMM communications network.
Figure 2:
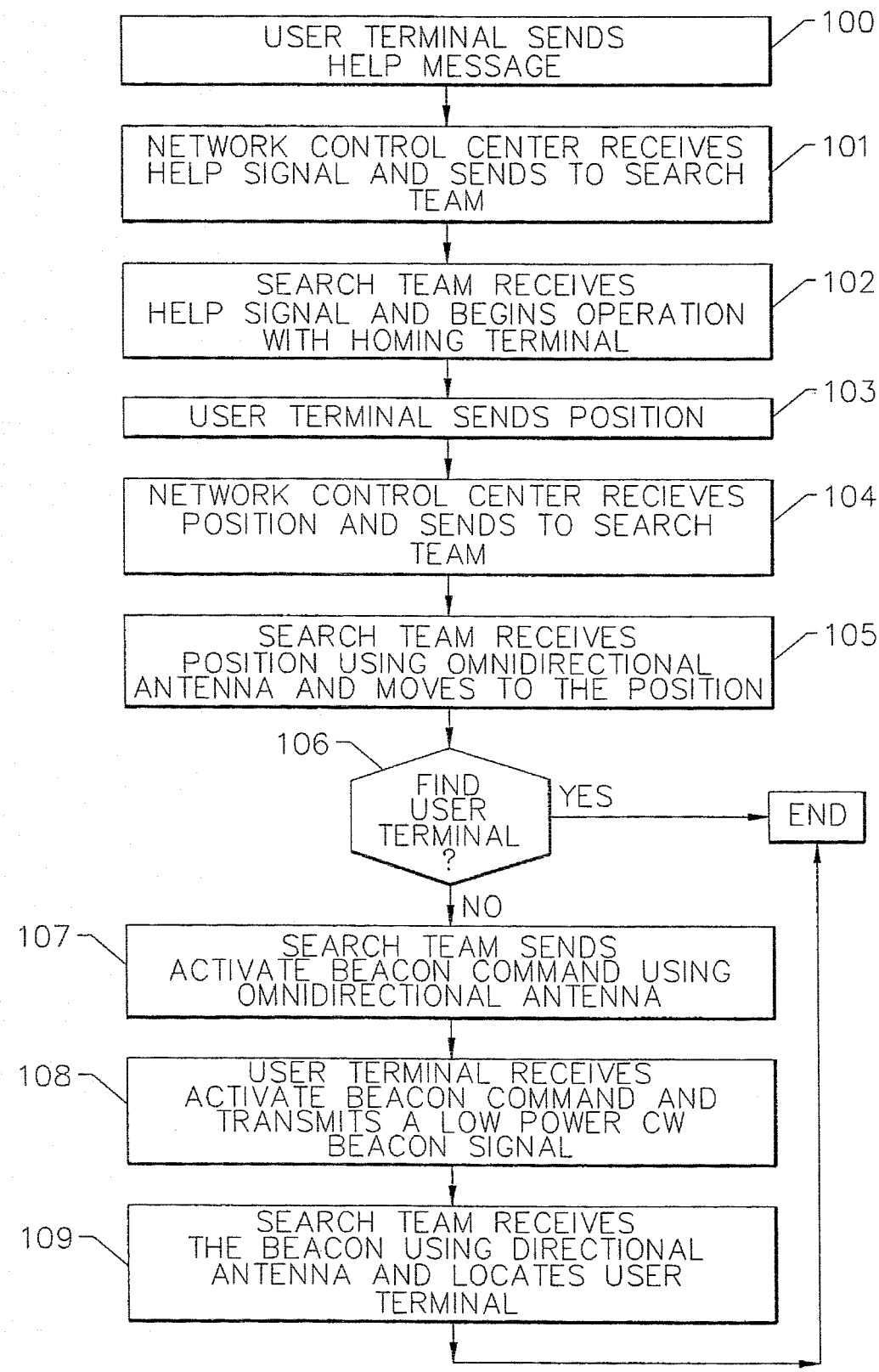
FIG. 2 is a block diagram of a global position determining method according to the invention.
Figure 3:
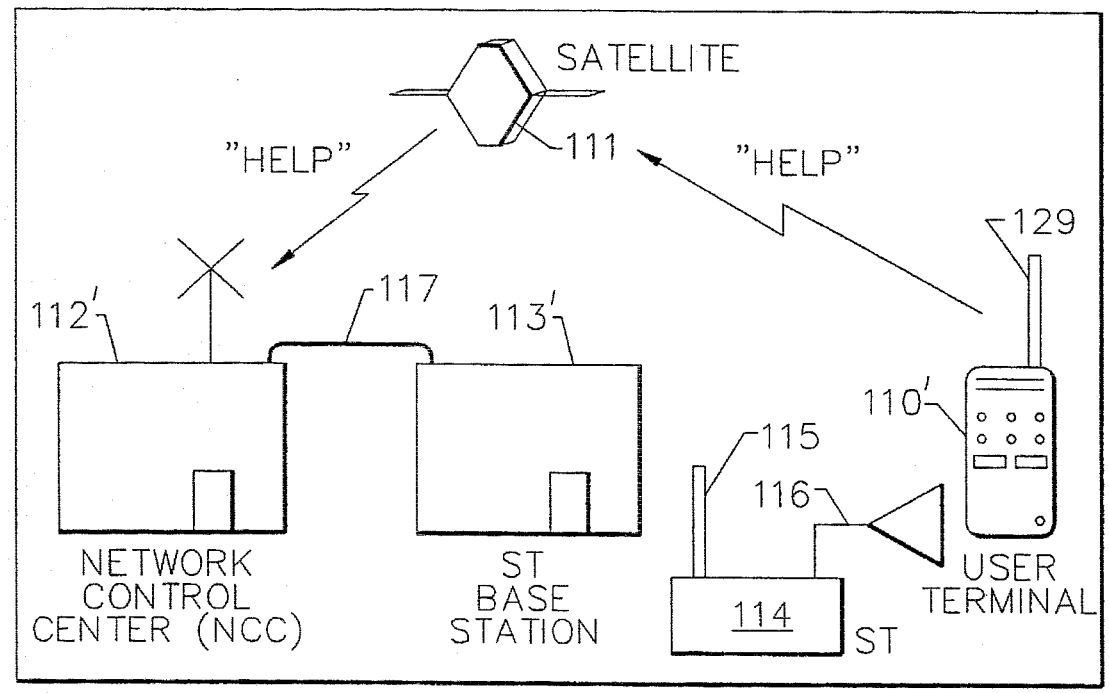
FIG. 3 is a schematic illustration of a first embodiment of a position determining system according to the invention.

Referring to FIG. 2, a preferred position determining operation according to the invention is illustrated. When in need of assistance, a victim activates a user terminal which can be an ORBCOMM remote unit which is modified as described below, and transmits a "help" message, as indicated at block 100. FIG. 3 illustrates this step and shows a help message being transmitted from the remote unit, referred to herein as a user terminal 110', via a satellite 111 to a network control center (NCC) 112' which could be the ORBCOMM network control center. The network control center can then alert a search team base station (ST) 113' over a dedicated connection to the NCC, by a direct telephone call, or in response to a MODEM polled inquiry over a standard phone line 117, as represented at block 101 of FIG. 2. Alternatively, an appropriately equipped homing terminal (described below) can receive the initial alert directly from the satellite 111.

The search team could be a national park service, the coast guard, or some similar organization. Upon reception of the distress message, the search team would prepare to begin their search. This could involve loading personnel in a vehicle or helicopter, and if they have reason to know a general direction in which to begin, they would leave the base station 113' heading in that direction, as illustrated at block 102 of FIG. 2.

After sending a help message, the user terminal 110' determines an initial approximate position, as represented by block 103 of FIG. 2. The user terminal 110' may require 7.5 minutes of measurement time in order to calculate its position. This time interval allows the user terminal 110' to lock onto a satellite 111 and make its initial position calculations. The user terminal software preferably uses measured doppler shifts of the received satellite frequency, along with satellite position information which is digitally encoded in the satellite downlink, to calculate the terminal position. The satellite 111 transmits its own position and velocity by virtue of the Global Positioning System. With these doppler measurements and the satellite position and velocity data, a user terminal 110' is able to determine its own position. This position determining methodology is consistent with that used by the proposed ORBCOMM network. One software algorithm of this type is described in *Satellite Doppler-Data Processing Using a Microcomputer*, by Schmid et al., *IEEE Transactions on Geoscience Electronics* Vol-16, No. 4 (October 1978).

The accuracy of the approximate position determination depends upon the period of time during which the data are collected. If doppler measurements are made on VHF signals only, there may be an error source due to the uncertainty of the ionospheric refraction. Thus, standard approximate position determining is expected to have an uncertainty of about one kilometer. By using an approximate position, a search team can quickly move toward the individual in distress.

Figure 4:
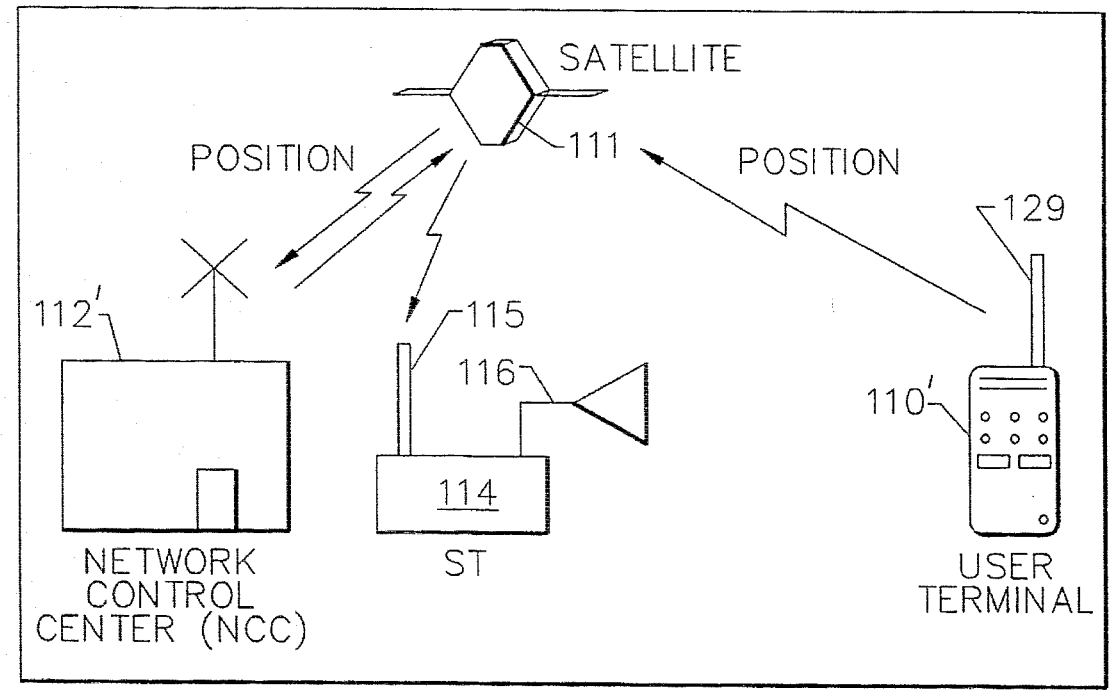
FIG. 4 is a schematic illustration of a second embodiment of a position determining system according to the invention.

The user terminal 110' sends its position to the network control center 112' through the satellite 111 automatically, as depicted in FIG. 4. Thus, a user need only activate the user terminal 110'; there is no need for response or any other involvement or comprehension of the search process. After calculating and sending its position, The user terminal 110' may continue to take measurements and refine its position. Alternatively, user terminal 110' may wait for receipt of an "activate homing beacon" command, as described below. FIG. 4 illustrates a second embodiment of the invention and indicates that the approximate position signal may be sent from either the base station 113' (not shown), the network control center 112', or as a direct relay from the satellite 111, as discussed below.

Upon receipt of the user terminal's approximate position, the network control center 112' notifies the search team, as indicated by block 104 of FIG. 2. The network control center 112' may use existing radio or phone links, or alternatively, an appropriately equipped homing terminal 114 can receive the approximate position directly from the satellite 111. As shown in FIG. 4, the network control center 112' can direct the satellite 111 to transmit the approximate position message directly to the homing terminal 114. The homing terminal 114 receives radio messages through an omnidirectional antenna 115.

Whether already in route to an assumed position, or having just received the approximate position, the search team can now proceed to the transmitted approximate position, as indicated by block 105 of FIG. 2. In some cases, good fortune will visit those in distress and a search team will find the victim as they are enroute to the approximate position location, as indicated in block 106 of FIG. 2. In the majority of cases, however, it is expected that the search team will arrive at the initial approximate position and begin a more systematic search. In a remote location, the battery of a conventional emergency beacon could expire because of the number of hours it might take for a search team to arrive at the approximate location. The user terminal 110' of the present invention, however, does not broadcast a homing beacon until a search team is in the area.

Figure 5:
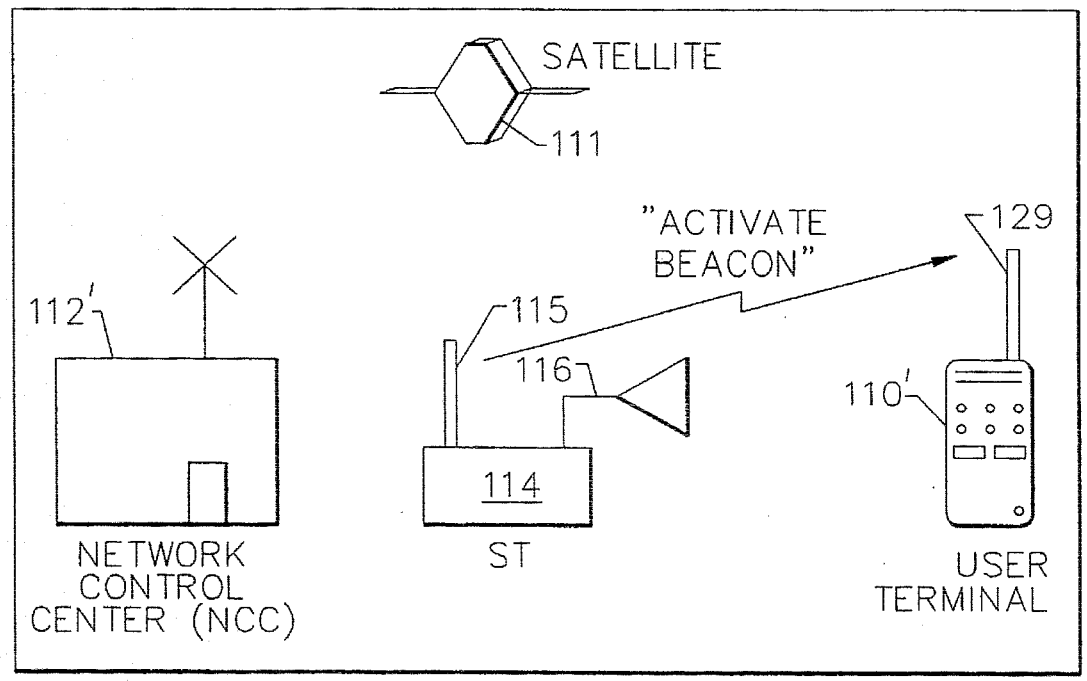
FIG. 5 is a schematic illustration of a homing terminal according to the invention moving toward an approximate position of a user terminal according to the invention.

The search team will direct their terminal 114 to transmit a digitally coded "activate beacon" command to the user terminal 110' which should be within a one to three kilometer radius, as shown in FIG. 5 and indicated at block 107 of FIG. 2. The command is preferably broadcast omnidirectionally, and preferably uses the same protocol and satellite transmit frequency as the satellite 111. Typically, a homing terminal's power level would be much greater than the satellite terminal's power level at the user terminal 110'. Those having skill in the art would recognize that the satellite 111 could also issue an activate beacon command to the user terminal 110'.

In an urban environment, a search team may be seeking a disabled, abandoned, or stolen vehicle, or its cargo. A user terminal 110' which is mounted within a vehicle could be programmed to respond to an addressed polling request with its initial approximate position. Then, when the search team arrives at the initial approximate position, the search terminal 114 can be directed to transmit the activate beacon command to the vehicle mounted user terminal 110'.

Figure 6:
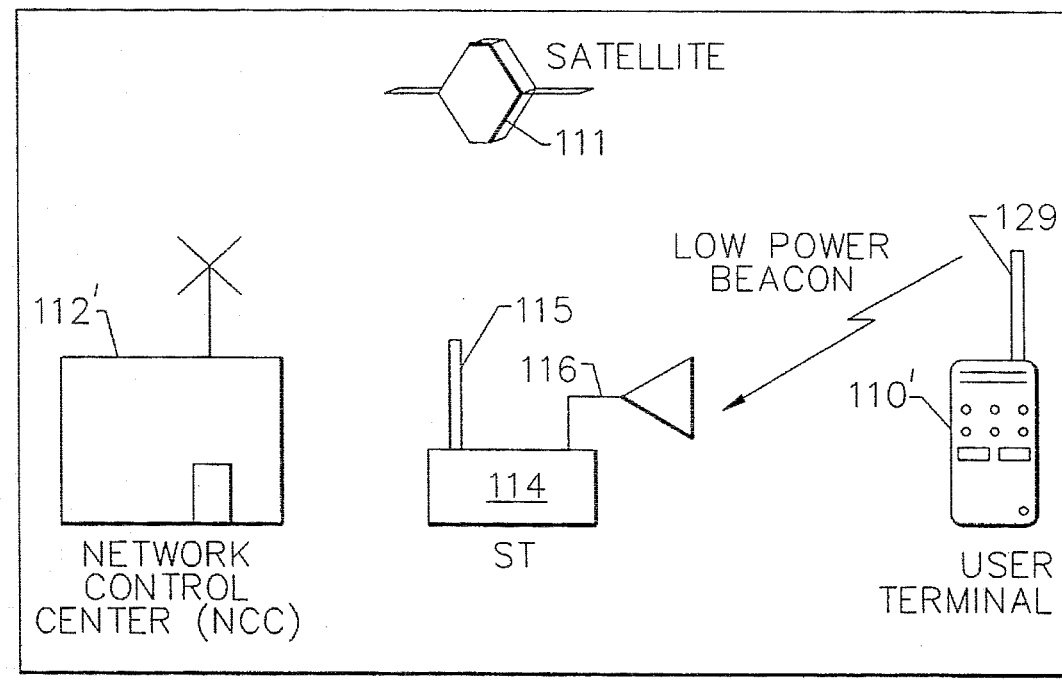
FIG. 6 is a schematic illustration of a user terminal according to the invention responding to a homing terminal's activate homing beacon command.

As indicated at block 108 of FIG. 2, the user terminal 110' responds to the beacon command by transmitting a homing beacon. The user terminal's homing beacon is preferably a low power, continuous wave homing beacon. The search team uses the directional antenna 116, of the homing terminal 114 to follow and close in on the homing beacon, as shown in FIG. 6.

Thus, the homing terminal 114 preferably utilizes two antennas, one being an omnidirectional antenna 115 and the other being a high gain directional antenna 116. The omnidirectional antenna 115 is used to radiate the activate homing beacon command and to receive the user terminal 110' position from the network control center 112', the base station 113', or the satellite 111. The high gain directional antenna 116 is used to receive the homing beacon signal from the user terminal 110'.

Figure 7:
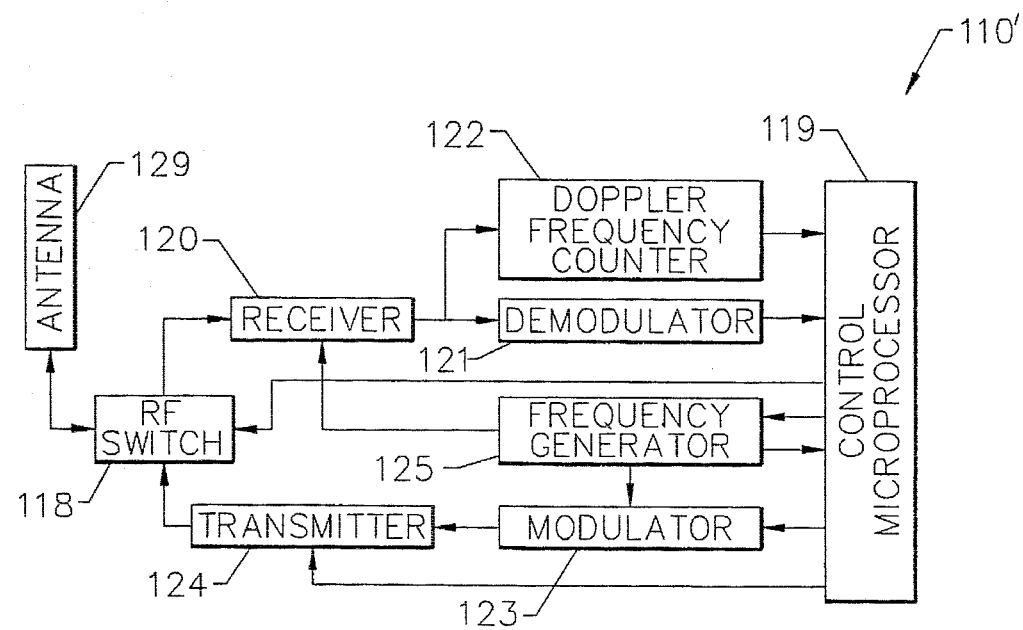
FIG. 7 is a block diagram of a user terminal according to the invention.

The preferred embodiment of the user terminal 110' consists of the basic circuitry shown in FIG. 7. The user terminals 110' can be pocket sized, can operate for long periods on battery power, and can have a simple omnidirectional whip antenna 129 fifty centimeters long. A radio frequency (RF) switch 118 is controlled by a microprocessor 119 for either a transmit or a receive mode. After a receiver 120 receives a downlink signal, it amplifies and mixes the signal to the correct power level and frequency for a demodulator 121 and a doppler frequency counter 122. The demodulator 121 strips the digital data from the received signal, and sends the data to the microprocessor 119. This data, if received from the satellite 111, contains the satellite position information. If received from the homing terminal 114, the data would contain the activate beacon command. The doppler frequency counter 122 measures the doppler frequency from the satellite 111 and provides the frequency information to the microprocessor 119.

The microprocessor 119 uses a position determination algorithm to determine the user terminal 110' position from the information received from the demodulator 121 and the doppler frequency counter 122. The microprocessor 119 then sends the user terminal position to a modulator 123. The microprocessor 119 also commands the modulator 123 and transmitter 124 to transmit a low power, continuous wave beacon when it recognizes the activate beacon command from the homing terminal 114. The modulator 123 uses digitally encoded information received from the microprocessor 119 to modulate the transmission frequency from a frequency generator 125. If a low power beacon is transmitted, the modulator 123 provides a continuous wave frequency to the transmitter 124.

The frequency generator 125 provides to the receiver 120 the local oscillator frequencies that are required to mix the received frequency to the correct frequency. It also furnishes the transmit frequency to the modulator 123. Depending on the transmission mode, the transmitter 124 receives either a modulated or continuous wave signal from the modulator 123.

The transmitter 124 of the user terminal 110' consists of a cascade of amplifiers that are used to amplify the received signal from the modulator 123 to the required power for transmission to communicate with the satellite 111. An automatic gain control amplifier is used as the first amplifying stage, and the gain of the amplifier is controlled by an automatic gain control circuit. A control voltage from the microprocessor 119 controls the transmitter operating mode, either normal mode or low power beacon mode.

A low power mode of the user terminal 110', which preserves terminal battery life, may be implemented in at least three ways. First, a change in the control voltage from the microprocessor 119 could override the automatic gain control circuit and place a fixed voltage at the automatic gain control amplifier, which would reduce the automatic gain control amplifier gain and thereby reduce the transmitter output voltage. Second, the low power mode may be accomplished by withholding DC power from the final transmitting amplifier stage and only transmitting the radio frequency feedthrough power. Third, the user terminal 110' could also have the capability to switch the final amplifier stage out of the transmit line. Those skilled in the art would recognize that there are many other configurations for the user terminal 110'.

Figure 8:
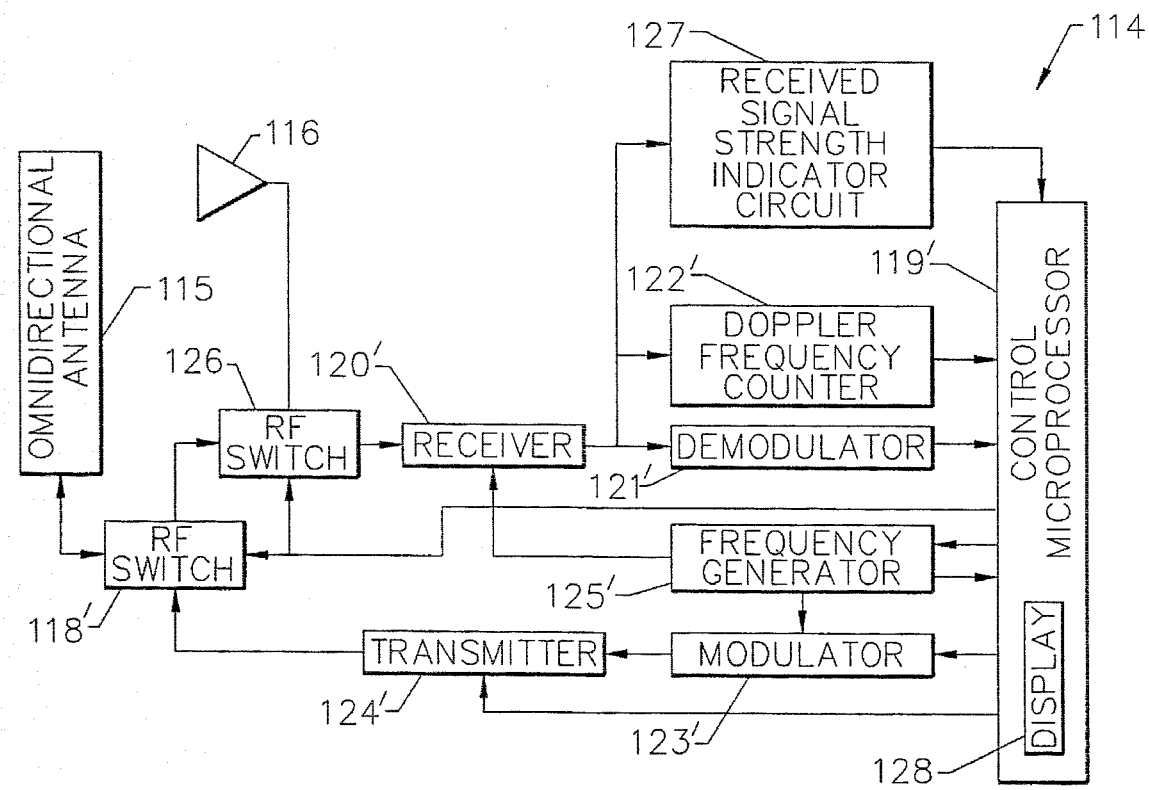
FIG. 8 is a block diagram of a homing terminal according to the invention.

The homing terminal 114 (FIG. 8) is similar to the user terminal 110', with like elements to those of FIG. 7 indicated by prime (') notation. In addition, the homing terminal 114 includes a directional antenna 116 for receiving the low power beacon from the user terminal 110'. The terminal 114 also includes a second RF switch 126 so that the homing terminal receiver 120' can be connected to either the omnidirectional antenna 115 or the directional antenna 116. After the low power beacon command is transmitted to a user terminal 110', the second RF switch 126 allows the homing terminal 114 to monitor the received power from the user terminal 110' using the directional antenna 116. A received signal strength indicator 127 provides a DC voltage to the microprocessor 119' that is proportional to the signal strength of the low power beacon. Also, the frequency generator 125' is modified so that the satellite transmission frequency is transmitted to the modulator 123' along with the activate beacon command.

The received signal strength indicator output can be made available to the search team in either an audio or visual format. For example, a liquid crystal display (LCD) 128 with a changing numerical range from one to ten, depending on the received signal strength, might be used. The search team would use this display 128 to further narrow the scope of their search until the victim is located.

The advent of advanced small satellites 111 and the low-cost rockets with which they are launched has facilitated operation of the global position determining apparatus of the present invention. The invention is intended to mesh with the ORBCOMM network described above, and the following design considerations are compatible with the needs of both systems.

Satellites in low-earth orbit can operate at VHF. For example, the satellite transmit frequency band can be 137–139 MHz, while the terminal transmission band can be 148–150 MHz. By setting the outbound data rate at 4800 bps and the inbound rate at 2400 bps, narrow band VHF channels can be used. The data stream can thus be transmitted to the satellite 111 on a 5 KHz wide channel in the 148–150 MHz band. Narrow band VHF also lowers costs, since it not only reduces the mass and cost of the satellites but also reduces the expense of the user terminals 110'. The cost of a user terminal 110' is presently contemplated to be less than $400. The present invention is thus less expensive than geostationary satellite systems and low earth orbiting voice services. The invention is also comparable with tower-based data services, but does not present the geographic limitation of any terrestrial network.

In the satellite 111, messages can be separated and transmitted downwards on one of a number of 10 KHz wide channels in the 137–139 MHz band. Each satellite may additionally transmit time signals and other data on a single designated UHF channel at, for example, 400.1 MHz. By measuring the doppler shifts on the downlink UHF signal, the one kilometer error can be considerably reduced, to less than 100 meters. Throughout the satellite network, emergency alerts would inherently be priority messages and therefore sent from a network control center 112' to a search team's base station 113' without delay.

The satellites 111 would typically be in a circular orbit at an altitude of approximately 775 km. Thus, the half-beamwidth would be close to 60 degrees, and the footprint diameter about 4600 km. The antenna pattern of the satellite 111 would be designed in order to produce increased gain away from the boresight in order to compensate for longer path lengths to user terminals 110' near the edge of the footprint.

A constellation of low earth orbiting satellites 111 yields a footprint pattern that continually changes, with the non-covered zones moving constantly as well. Preferably, satellites 111 do not have large memories and thus would not operate in a full store and forward mode. Thus, the availability of a satellite link would require that one of the satellites 111 has simultaneous sight of the user terminal 110' and either the network control center 112' or a relay station. In any event, it is contemplated that most regions would have availability times well in excess of ninety-five percent.

By way of example, an availability at a certain remote terminal location of ninety-eight percent would mean that, on average, there would be a communications outage at that location for two percent of the time, or for twenty-nine minutes in each 24 hour period. This does not mean, however, that there would be a single outage every day lasting nearly a half-hour. On the contrary, the outages would be frequent, short, and fairly uniformly distributed in time. It is estimated that with a ninety-five percent contour, ninety percent of the outages would last for less than two minutes. The global position determining method according to the present invention is not hampered by outages of this type. Instead, these outages permit a low cost and effective world-wide position determining apparatus.

In the drawings and specification, there have been disclosed typical preferred embodiments of the invention and, although specific terms are employed, they are used in a generic and descriptive sense only and not for purposes of limitation, the scope of the invention being set forth in the following claims.

That which is claimed:

1. A position determining method which uses a satellite for transmitting signals between a mobile homing terminal having a directional antenna and a user terminal having a transmitter and a homing beacon, said method comprising the steps of:

generating, at the user terminal, an approximate position signal of the user terminal;

transmitting the approximate position signal from the user terminal to the mobile homing terminal via the satellite;

moving the mobile homing terminal toward the approximate position;

transmitting an activate homing beacon command to the user terminal when the mobile homing terminal has approached the approximate position;

activating the homing beacon of the user terminal in response to receipt of the activate homing beacon command; and locating the user terminal using the directional antenna of the mobile homing terminal and the activated homing beacon.

2. A method according to claim 1 wherein the step of determining an approximate position is preceded by the following step which is performed by the satellite:

transmitting satellite position data and satellite velocity data; and wherein said determining step comprises the steps of:
receiving the transmitted satellite position data and satellite velocity data from the satellite; and
determining an approximate position of the user terminal from the received satellite position data, satellite velocity data, and doppler shift measurements.

3. A method according to claim 1 wherein the step of transmitting an approximate position signal comprises the step of transmitting an approximate position signal from the user terminal to the satellite, from the satellite to a network control center, and from the network control center to the mobile homing terminal.

4. A method according to claim 3 wherein the approximate position signal is transmitted from the network control center to the mobile homing terminal via a base station.

5. A method according to claim 1 wherein the step of transmitting an activate homing beacon command is performed by the satellite.

6. A method according to claim 1 wherein the step of transmitting an activate homing beacon command is performed by the mobile homing terminal.

7. A method according to claim 1 wherein the step of activating the homing beacon comprises the step of activating a low power continuous wave homing beacon.

8. A method according to claim 1 wherein the step of locating the user terminal comprises the steps of:
orienting the directional antenna of the mobile homing terminal in a first direction which has a strong homing beacon reception relative to other directions; and
moving towards the homing beacon in the first direction.

9. A method of operating a battery powered user terminal to conserve battery power during a search mission, comprising the steps of:
generating an approximate position signal of the user terminal;
transmitting the approximate position signal;
inhibiting transmission of a homing beacon of the user terminal until receipt of an activate homing beacon command; and
activating the homing beacon upon receipt of the activate homing beacon command.

10. A method according to claim 9 wherein the step of determining an approximate position comprises the steps of:
receiving transmitted satellite position data and satellite velocity data from a satellite; and
determining an approximate position from the received satellite position data, satellite velocity data, and doppler shift measurements.

11. A method according to claim 9 wherein the step of activating the homing beacon comprises the step of activating the homing beacon in response to an activate homing beacon command from a satellite.

12. A method according to claim 9 wherein the step of activating the homing beacon comprises the step of activating the homing beacon in response to an activate homing beacon command from a mobile homing terminal.

13. A method according to claim 9 wherein the step of activating the homing beacon comprises the step of activating a low power continuous wave homing beacon.

14. A method of operating a mobile homing terminal having a directional antenna, in order to conserve battery power of a battery powered user terminal during a search mission, comprising the steps of:
receiving an approximate position signal of the user terminal;
moving the mobile homing terminal towards the approximate position based upon the received approximate position signal of the user terminal;
transmitting an activate homing beacon command when the mobile homing terminal approaches the approximate position; and
locating the user terminal using the directional antenna of the mobile homing terminal and the activated homing beacon of the user terminal.

15. A method according to claim 14 wherein said receiving step comprises the step of receiving an approximate position signal from a network control center.

16. A method according to claim 14 wherein said receiving step comprises the step of receiving an approximate position signal from a satellite.

17. A method according to claim 14 wherein said receiving step comprises the step of receiving an approximate position signal from a base station.

18. A method according to claim 14 wherein the step of transmitting an activate homing beacon command comprises the step of transmitting an activate a low power continuous wave homing beacon command.

19. A method according to claim 14 wherein the step of locating the user terminal comprises the steps of:
orienting the directional antenna of the mobile homing terminal in a first direction which has a strong homing beacon reception relative to other directions; and
moving towards the homing beacon in the first direction.

20. A position determining system comprising:
a mobile homing terminal; and
a battery powered user terminal comprising:
means for generating an approximate position signal of the user terminal;
means for transmitting the approximate position signal in response to user activation, to initiate a search mission; and
means, responsive to radio reception of an activate homing beacon command, for activating a homing beacon; and
wherein said mobile homing terminal comprises:
means for receiving an indication of said approximate position signal from said battery powered user terminal; and
means, responsive to receipt of said homing beacon, for homing on said homing beacon to locate the user terminal.

21. A position determining system according to claim 20 wherein said mobile homing terminal further comprises means, responsive to user activation, for transmitting said activate homing beacon command.

22. A position determining system according to claim 20 further comprising a satellite for relaying said approximate position signal between said battery powered user terminal and said mobile homing terminal.

23. A position determining system according to claim 22 further comprising a network control center for relaying said approximate position signal between said satellite and said mobile homing terminal.

24. A position determining system according to claim 23 further comprising a base station for relaying said approximate position signal between said network control center and said mobile homing terminal.

25. A position determining system according to claim 20 wherein said means for generating the approximate position signal further comprises:

means for determining the approximate position of said battery powered user terminal in response to received satellite data.

26. A position determining system according to claim 25 wherein said means for determining an approximate position comprises:

means for measuring doppler shifts in said received satellite data; and means for calculating said approximate position from said satellite data and said measured doppler shifts.

27. A position determining system according to claim 21 wherein said means for transmitting said activate homing beacon command comprises means for transmitting an activate a low power continuous wave homing beacon command.

28. A position determining system according to claim 21 wherein said means for transmitting said activate homing beacon command comprises means for omnidirectionally transmitting said activate homing beacon command.

29. A position determining system according to claim 20 wherein said means for homing on said homing beacon comprises means for indicating received signal strength of said homing beacon.

30. A position determining system according to claim 20 wherein said means for homing on said homing beacon comprises means for displaying received signal strength of said homing beacon.

31. A mobile homing terminal comprising:

means for receiving an indication of an approximate position signal from a battery powered user terminal;

means for transmitting an activate homing beacon command to the user terminal to thereby activate a homing beacon thereof when the mobile homing terminal approaches the user terminal; and means, responsive to receipt of a homing beacon, for homing on said homing beacon to locate the user terminal.

32. A mobile homing terminal according to claim 31 wherein said means for receiving an indication of an approximate position signal comprises means for receiving an indication of an approximate position signal from a satellite.

33. A mobile homing terminal according to claim 31 wherein said means for receiving an indication of an approximate position signal comprises means for receiving an indication of an approximate position signal from a network control center.

34. A mobile homing terminal according to claim 31 wherein said means for receiving an indication of an approximate position signal comprises means for receiving an indication of an approximate position signal from a base station.

35. A mobile homing terminal according to claim 31 wherein said means for transmitting an activate homing beacon command comprises means for transmitting an activate a low power continuous wave homing beacon command.

36. A mobile homing terminal according to claim 31 wherein said means for transmitting an activate homing beacon command comprises means for omnidirectionally transmitting said activate homing beacon command.

37. A mobile homing terminal according to claim 31 wherein said means for homing on said homing beacon comprises means for indicating received signal strength of said homing beacon.

38. A mobile homing terminal according to claim 31 wherein said means for homing on said homing beacon comprises means for displaying received signal strength of said homing beacon.

39. A battery powered user terminal comprising:

means for generating an approximate position signal for the user terminal;

means for transmitting the approximate position signal in response to user activation, to initiate a search mission;

a homing beacon; and means for activating said homing beacon responsive to radio reception of an activate homing beacon command.

40. A battery powered user terminal according to claim 39 wherein said means for transmitting an approximate position signal comprises means for transmitting an approximate position signal to a satellite.

41. A battery powered user terminal according to claim 39 wherein said means for generating the approximate position signal further comprises means for determining an approximate position in response to received satellite data.

42. A battery powered user terminal according to claim 41 wherein said means for determining an approximate position comprises:

means for measuring doppler shifts in said received satellite data; and means for calculating said approximate position from said satellite data and said measured doppler shifts.

43. A battery powered user terminal according to claim 39 wherein said means for activating a homing beacon comprises means for activating a low power continuous wave homing beacon.

44. A battery powered user terminal according to claim 39 wherein said means for activating a homing beacon is responsive to receipt of an activate homing beacon command from a satellite for activating the homing beacon.

45. A battery powered user terminal according to claim 39 wherein said means for activating a homing beacon is responsive to receipt of an activate homing beacon command from a homing terminal for activating the homing beacon.

\* \* \* \* \*